(12) United States Patent
Frampton et al.

(10) Patent No.: US 10,715,019 B2
(45) Date of Patent: Jul. 14, 2020

(54) DUAL AXIS MOTOR

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 172 days.

(21) Appl. No.: 15/983,323

(22) Filed: May 18, 2018

(65) Prior Publication Data

US 2019/0356206 A1 Nov. 21, 2019

(51) Int. Cl.
*H02K 16/00* (2006.01)
*H02K 7/116* (2006.01)
*H02K 26/00* (2006.01)
*H02K 11/30* (2016.01)
*F16H 3/54* (2006.01)
(Continued)

(52) U.S. Cl.
CPC ............... *H02K 26/00* (2013.01); *F16H 3/54* (2013.01); *F16H 61/0202* (2013.01); *H02K 7/102* (2013.01); *H02K 7/116* (2013.01); *H02K 11/30* (2016.01); *H02K 16/00* (2013.01); *F16H 2200/0034* (2013.01); *F16H 2200/2005* (2013.01)

(58) Field of Classification Search
CPC ........ H02K 16/00; H02K 7/116; H02P 5/747; B60K 2007/003; B60K 17/14; B60K 17/046
See application file for complete search history.

(56) References Cited

U.S. PATENT DOCUMENTS

| 6,497,201 B1 | 12/2002 | Werson |
| 6,605,883 B2 | 8/2003 | Isozaki et al. |
| 7,030,528 B2 | 4/2006 | Morgante |

(Continued)

FOREIGN PATENT DOCUMENTS

| CN | 101165998 A | 4/2008 |
| CN | 101359860 A | 2/2009 |

(Continued)

OTHER PUBLICATIONS

European Search Report for European Patent Application No. 19174943.1-1201 dated Oct. 14, 2019.
(Continued)

*Primary Examiner* — Sherry L Estremsky
(74) *Attorney, Agent, or Firm* — Lempia Summerfield Katz LLC

(57) ABSTRACT

A dual axis motor a first epicyclic gear, a second epicyclic gear, a rim gear, an inner rotor, an outer rotor, a brake and a stator assembly. The second epicyclic gear is operative to mesh with the first epicyclic gear and move in around the first epicyclic. The inner rotor is fixedly connected to the first epicyclic gear. The outer rotor fixedly is connected to the second epicyclic gear. The stator assembly spaced from the inner rotor by a first gap and spaced from the outer rotor by a second gap. The motor provides a resultant torque to driven device. The resultant torque is provided by the inner rotor, outer rotor, the brake, or by sudden deceleration of one or more elements within the dual axis motor. The gear ratio provided by the first and second epicyclic gear allow for an enhanced speed range while providing high starting torque.

18 Claims, 14 Drawing Sheets

(51) Int. Cl.
*F16H 61/02* (2006.01)
*H02K 7/102* (2006.01)

(56) References Cited

U.S. PATENT DOCUMENTS

| | | | |
|---|---|---|---|
| 7,172,524 B2* | 2/2007 | Moeller | B60L 50/16 |
| | | | 475/5 |
| 7,830,063 B2 | 11/2010 | Jansen et al. | |
| 7,956,504 B2* | 6/2011 | Quere | H02K 7/116 |
| | | | 310/114 |
| 8,701,805 B2 | 4/2014 | Park | |
| 8,758,178 B2* | 6/2014 | Gunji | B60K 7/0007 |
| | | | 475/5 |
| 8,928,266 B1* | 1/2015 | Lin | H02K 7/116 |
| | | | 318/139 |
| 8,930,055 B2* | 1/2015 | Yuan | H02K 51/00 |
| | | | 180/65.1 |
| 8,987,962 B2 | 3/2015 | Kim | |
| 9,124,161 B2 | 9/2015 | Kim | |
| 9,184,649 B2* | 11/2015 | Webster | H02K 16/00 |
| 9,216,642 B2* | 12/2015 | Friedmann | B60K 7/0007 |
| 9,976,243 B2* | 5/2018 | Kim | D06F 37/40 |
| 10,320,277 B2* | 6/2019 | Gassmann | B60K 1/00 |
| 2002/0153792 A1 | 10/2002 | Isozaki et al. | |
| 2004/0155554 A1 | 8/2004 | Morgante | |
| 2004/0174082 A1 | 9/2004 | Graham | |
| 2007/0281558 A1 | 12/2007 | Jansen et al. | |
| 2009/0278415 A1 | 11/2009 | Park | |
| 2010/0139999 A1 | 6/2010 | Park | |
| 2012/0161497 A1* | 6/2012 | He | B60K 7/0007 |
| | | | 301/6.5 |
| 2013/0093275 A1 | 4/2013 | Kim | |
| 2013/0093276 A1 | 4/2013 | Kim | |
| 2013/0190961 A1 | 7/2013 | Yuan | |
| 2014/0306565 A1 | 10/2014 | James | |
| 2017/0117784 A1 | 4/2017 | Guo et al. | |
| 2019/0168605 A1* | 6/2019 | Yamamoto | B60L 15/2054 |

FOREIGN PATENT DOCUMENTS

| | | | |
|---|---|---|---|
| CN | 101499699 A | 8/2009 | |
| CN | 101588144 A | 11/2009 | |
| CN | 103640470 A | 3/2014 | |
| DE | 102005008148 A1 | 8/2006 | |
| DE | 102014216997 A1 | 3/2016 | |
| EP | 0845850 A1 | 6/1998 | |
| FR | 2811267 A1 * | 1/2002 | H02K 16/00 |
| JP | 2006296060 A | 10/2006 | |
| KR | 20050000245 A | 1/2005 | |
| WO | 9106147 A1 | 5/1991 | |
| WO | WO-2008118037 A1 * | 10/2008 | F16H 3/727 |
| WO | 2009102135 A2 | 8/2009 | |

OTHER PUBLICATIONS

"A Novel Magnetic-geared Electronic-continuously Variable Transmission Propulsion System for Hybrid Electric Vehicles" Hybrid Electric Vehicles. Research Frontiers; Issue 21. Source: htto://www.uqc.edu.hklminisitelrocnewsletter/rocnews21/eng/07.htm—Date Accessed: May 15, 2017.

Salihu Mustafa, Shehu, et al. "Torque distribution characteristics of a novel double-stator permanent magnet generator integrated with a magnetic gear." Energies 10.1 (2016): 2.

Torkaman, Hossein, et al. "New double-layer-per-phase isolated switched reluctance motor: concept, numerical analysis, and experimental confirmation." IEEE Transactions on Industrial Electronics 59.2 (2012): 830-838.

* cited by examiner

US 10,715,019 B2

DUAL AXIS MOTOR

FIELD

This application relates to the field of motors, and more specifically, a dual axis motor for driving a rotary device.

BACKGROUND

A motor is an electric machine that converts electrical energy to mechanical energy. The moving part of the motor is a rotor, which includes a mechanical output such as a shaft. The stationary part of the motor is a stator which includes coils and is separated from the rotor by an air gap. The coils in the stator of the motor generate a magnetic field that provides a force to magnets or other currents in the rotor of the motor.

The torque available from the output of the motor is defined by the magnetic field in the air gaps that cause the interaction between the rotor and the stator. The torque is limited by the physical properties of the motor. A typical motor does not provide a mechanism to achieve bursts of higher torque without saturating the magnetic core and rendering any increase in current as useless. In addition, driving the motor to achieve bursts of torque can damage the motor.

BRIEF DESCRIPTION OF THE DRAWINGS

Exemplary embodiments are described herein with reference to the following drawings.

DETAILED DESCRIPTION

In many motor applications, starting wheel torque limits the size of the motor that is required. Starting wheel torque is an example of a breakaway torque. Starting wheel torque is the amount of torque required to overcome the inertia, and any other opposing forces, of a resting wheel. In a simple example, the starting torque for an automobile is greater than the torque required to keep the automobile or wheel in motion once it has started moving. The torque required to keep the automobile or wheel in motion once it has started moving is the running torque. Pull-up torque is the minimum amount of torque generated by the motor between standstill and operating speed. If the pull-up torque of the motor is less than the required amount of torque, the motor may overheat and/or stall.

In many applications, the ratio (or difference) between the starting wheel torque is within a predetermined ratio (e.g., 2-10) of the running torque. In these applications the motor sized to provide the running torque is sufficient to provide the starting wheel torque. However, in some applications the ratio (or difference) between the starting wheel torque is greater at a ratio (e.g., 5-100) greater than the predetermined ratio. These examples occur when the wheel is stuck or very difficult to move. One example may be a tire stuck in a frozen material such as water or mud. Another example may be an inflatable tire that is low or flat and has settled against the ground.

The following examples provide a dual axis motor including two motor components that together can provide a starting wheel torque that is much greater than either of the two motor components could provide individually. Each of the motor components are connected to a portion of a planetary gear system. The planetary gear system drives the wheel.

Figure 1:
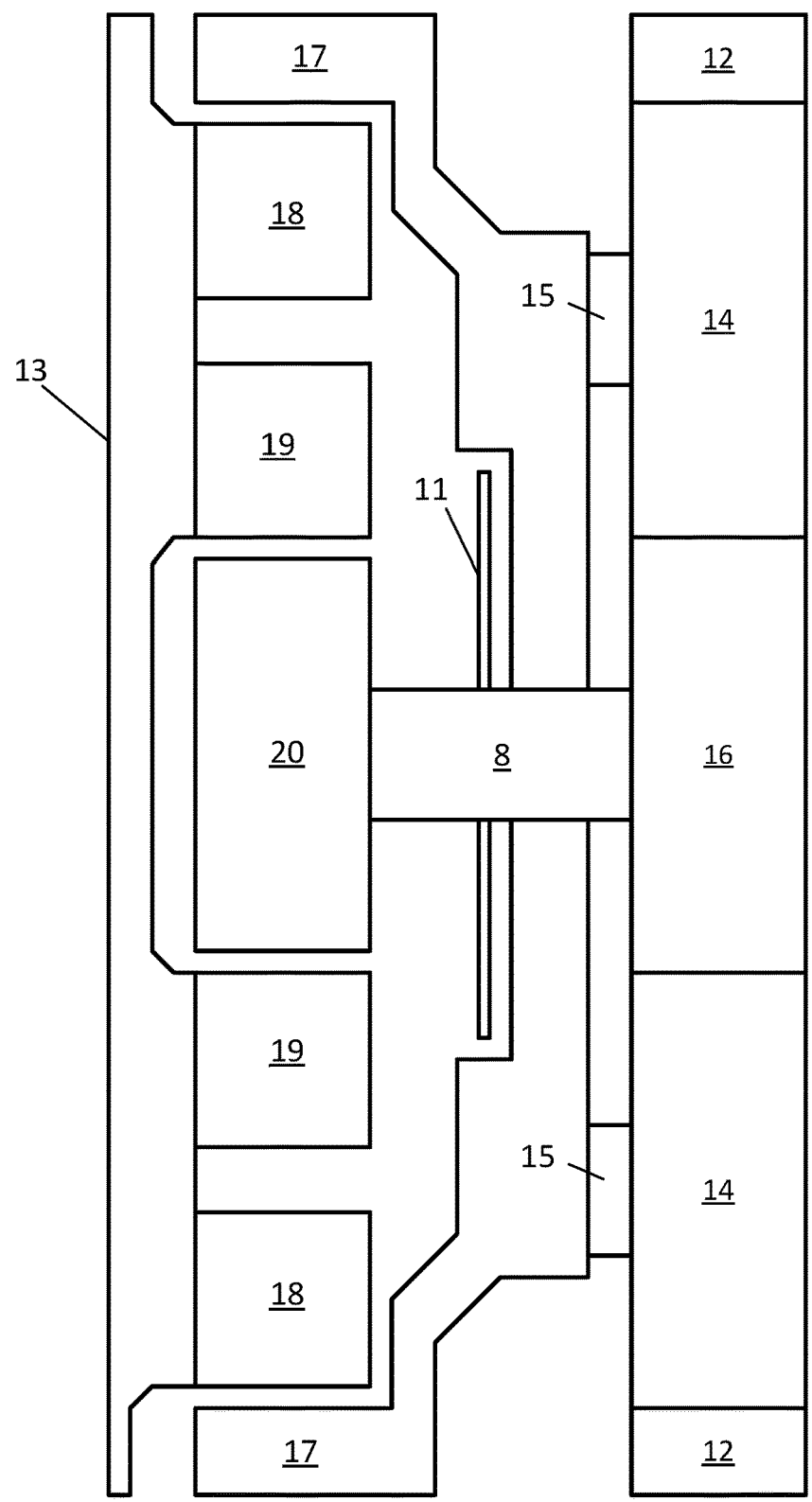
FIG. 1 illustrates an example side view of a dual axis motor.
Figure 2:
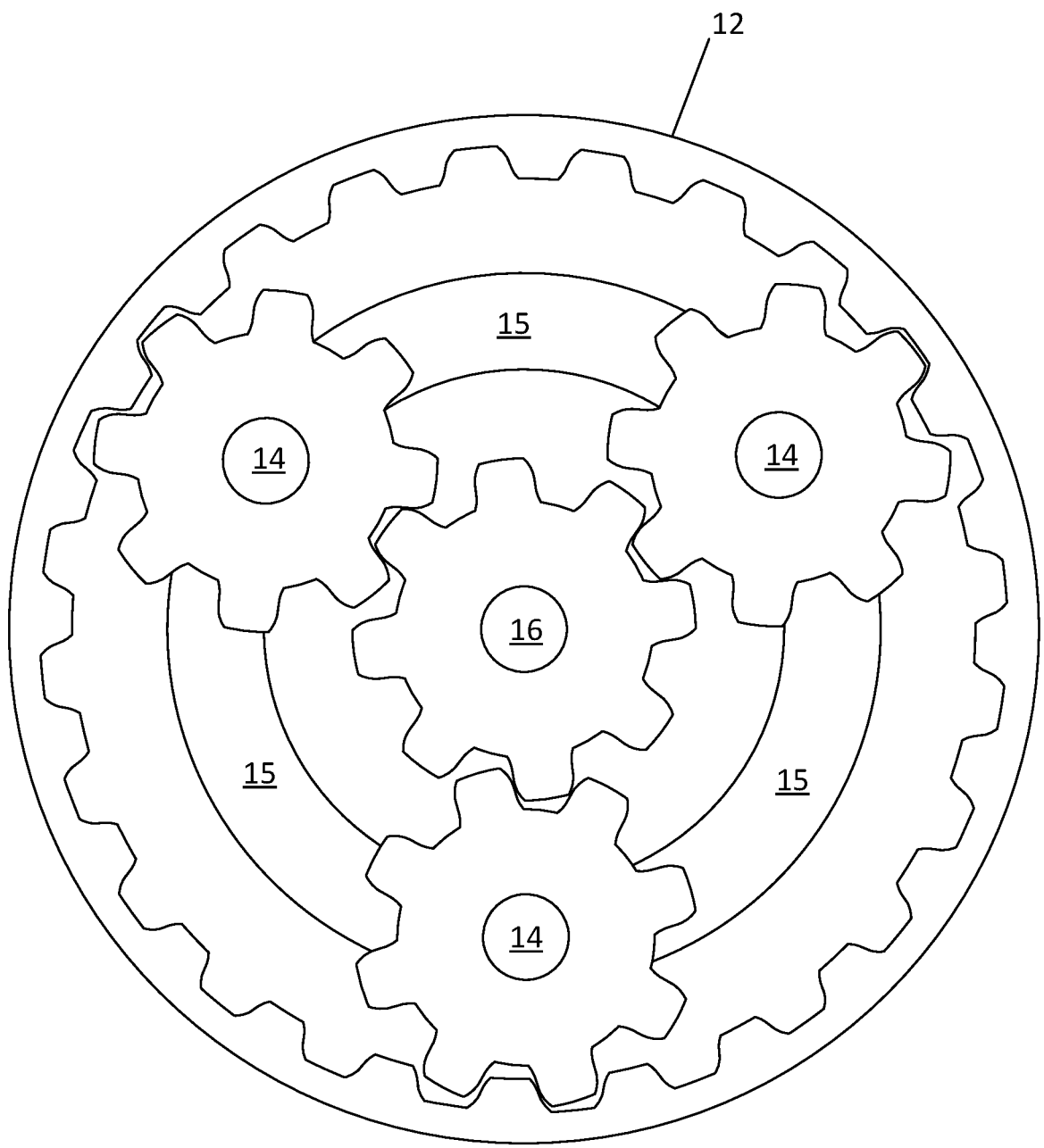
FIG. 2 illustrates an example planetary gear system for the dual axis motor of FIG. 1.

FIG. 1 illustrates an example side view of a dual axis motor. The dual axis motor includes a planetary gear assembly and a motor assembly. FIG. 2 illustrates an example planetary gear system for the dual axis motor of FIG. 1. The planetary gear assembly includes a rim 12, planets 14, and a sun 16. The motor assembly includes an outer rotor 17, an outer stator 18, an inner stator 19, and an inner rotor 20. Additional, different, or fewer components may be included.

The planetary gear assembly includes one or more epicyclic gears. For example, planets 14 and sun 16 are examples of epicyclic gears. One of the epicyclic gears rotates around another of the epicyclic gears. For example, planets 14 rotate around the sun 16. The sun 16 may be a first epicyclic gear and one or more planets 14 may be a second epicyclic gear operative to mesh with the first epicyclic gear and move in relation to the first epicyclic to be carried around the first epicyclic gear. The planets 14 and sun 16 include gear teeth that mesh so that a circumferential edge of the planets 14 rotate at the same speed as the circumferential edge of the sun 16. The gear teeth insure that there is no slip between the planets 14 and the sun 16. A carrier 15 connects the outer rotor 17 to the planets 14. The carrier 15 may include one or more shafts connected to respective planets 14 and the outer rotor 17. A shaft 8 connects the sun 16 to the inner rotor 20. Other embodiments are contemplated where the inner rotor drives the planets or the outer rotor drives the rim gear.

The sun 16 and the planets 14 may rotate in different patterns. In a first example, the sun 16 may be driven and, in turn, drives the rotation of the planets 14. In a second example, the sun 16 is not driven and the planets 14 are driven (via the carrier 15) to rotate around the sun 16. In a third example, the sun 16 is driven and the carrier 15 of the planets 14 are driven in the same direction, such that the planets 14 rotate and the sum of the driven speed of the sun 16 and the speed of the carrier 15 of the planets 14 is the rotational speed of the planets 14. In a fourth example, the sun 16 is driven and the carrier 15 of the planets 14 are driven in the different directions, such that the planets 14 rotate and the different of the driven speed of the sun 16 and the speed of the carrier 15 of the planets 14 in the rotational speed of the planets 14. In each of these examples, a point on the circumferential edge of any of the planets 14 traces a roulette shape or an epicycloid curve.

The rim 12 may be operative to mesh with the one or more planets 14. The rim 12 includes gear teeth that mesh so that a circumferential edge of the planets 14 rotate at the same speed as the inner edge of the rim 12. The gear teeth insure that there is no slip between the planets 14 and the rim 12.

The planetary gear assembly is physically connected to the motor assembly. The outer rotor 17 may be physically connected to the planets 14 via the carrier 15 or to the rim 12, and the sun 16 may be physically connected to the inner rotor 20 or the planets 14 via the carrier 15. The outer rotor 17 magnetically interfaces with the outer stator 18, and the inner rotor 20 magnetically interfaces with the inner stator 19. The outer stator 18 causes the outer rotor 17 to rotate, and the inner stator 19 causes the inner rotor 20 to rotate. The outer stator 18 may generate a magnetic field that causes the outer rotor 17 to rotate, and the inner stator 19 may generate a magnetic field that causes the inner rotor 20 to rotate.

The carrier 15 may provide an output rotation to a driven device (e.g., rotary device). The driven device may be physically connected to the carrier 15 such that a component of the driven device rotates with the carrier 15. The rotation of the carrier 15 may be attributable in part to the motor of the outer rotor 17 and the outer stator 18. The rotation of the carrier 15 may be attributable in part to the relative rotation of the sun 16 to the extent the sun 16 causes the planets 14 to rotate and drive the carrier 15. The rotation of the carrier 15 may be attributable in part to the relative rotation of the rim 12 to the extent the rim 12 causes the planets 14 to rotate and drive the carrier 15. Thus, the output rotation of the carrier 15 is caused by any combination of the sun 16, the planets 14, and the rim 12. The output rotation of the carrier 15 includes a first torque associated with the first epicyclic gear and a second torque associated with the second epicyclic gear. In addition, the output rotation of the carrier may include a third torque associated with the rim 12 or a ring gear.

The driven device may be a drive shaft of a vehicle. The drive shaft may rotate with the rim 12 and drive one or more wheels of the vehicle. Alternatively, the rim 12 may be directly connected to one of the wheels of the vehicle. In addition, two or more wheels of the vehicle may be connected to different dual axis motors. The vehicle may be any apparatus that moves under mechanical energy from within the vehicle. The vehicle may be an automobile, a lawnmower, golf cart, an all-terrain vehicle, or other vehicles. The driven device may be a tool such as an impact wrench, a nail gun, a jack hammer, air hammer, or another tool. The driven device may have a load that causes a demand signal to be generated by the driven device and provided in a feedback loop to the dual axis motor.

Figure 3:
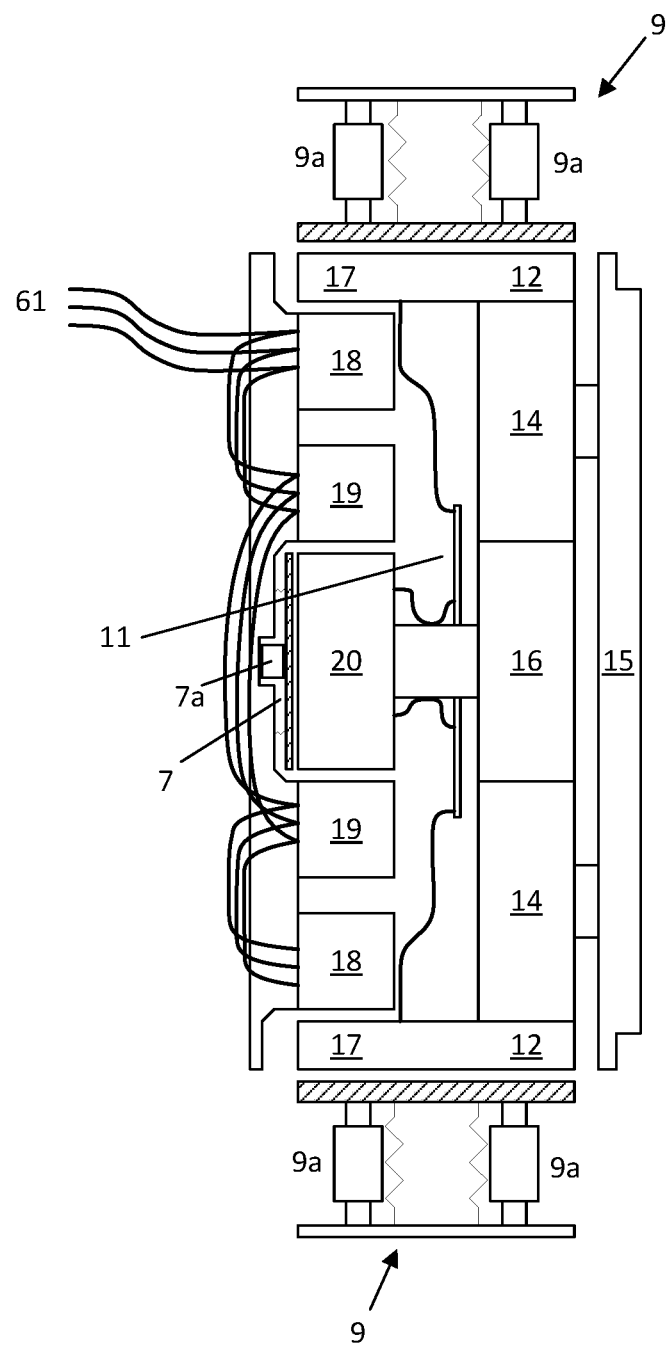
FIG. 3 illustrates another view of the dual axis motor of FIG. 1 including power connections and a rim brake.

FIG. 3 illustrates another view of a dual axis motor with driven sun 16 and rim 12, with planet carrier 15 connected to a driven load and including power inputs and connections. A power input 61 provides electrical power to the outer stator 18 and the inner stator 19. The outer stator 18 and the inner stator 19 include one or more coils of wire for generating respective magnetic fields. FIG. 3 also illustrates a brake 9 configured to come in contact with the rim 12 to slow and/or stop the rim 12. Additional different or fewer components may be included.

A printed circuit board (PCB) 11 includes circuitry for controlling the dual axis motor. The circuit board 11 may include a motor controller that generates commands for controlling the power input 61. The circuit board 11 may include a brake controller that generates commands for the brake 9. The circuit board 11 may include a communication device to communicate with other electrical machines (e.g., other motors or generators) or with other devices, such as a controller or user interface.

The motor controller controls the dual axis motor by setting the currents provided to the stator (e.g., the outer stator 18 and the inner stator 19). The motor controller may set the current that flows through windings in the stator. The motor controller may generate an inner stator command that defines the current through the windings or electromagnet of the inner stator 19 and an outer stator command that defines the current through the windings or electromagnet of the outer stator 18. The motor controller may provide the currents to the stator. The motor controller may provide a control signal or message to another controller or control circuit that generates the currents for the stator.

The stator currents may largely define the magnetic fields in the air gaps of the dual axis motor. The magnetic fields in the inner air gap and the outer air gap may be controlled independently. In one example, the magnetic field increases as the current through the respective stator is increased, applying a torque to the respective rotor in response to the magnetic field. The magnetic field may be proportional to the speed that the rotor turns. In another example, the speed that the rotor turns depends on the excitation frequency of the current in the stator or in the difference between the rotating magnetic flux in the stator and the relative rotating magnetic flux in the rotor. The magnetic flux in either or both rotors may be controlled to change output speed of the machine.

The circuit board 11 may include a brake controller that generates commands for the brake 9. The brake 9 includes an actuator 9a, a support member 9b, and a brake pad 9c. The actuator 9a may be a solenoid or another device for bringing the brake pad 9c in and out of contact with the rim 12. The brake controller may generate a drive signal or driving command for controlling the actuator(s) 9a. The actuator(s) 9a may include an electromagnet outside of a core tube, and a plunger shaped to fit inside of the core tube. In response to the drive signal, the electromagnetic is energized to move the plunger with respect to the core tube. The plunger moves the brake pad(s) with respect to the support member(s) and/or the rim 12. The brake pad(s) makes frictional contact with the rim 12 and slows or stops the rim 12. The brake pad may also be applied against the rim by spring(s), with the actuator(s) 9a applying to counteract the force of the spring and release the brake.

In addition, the brake controller may control a brake on the inner rotor 7. This brake may include a frictional device (e.g. brake pad), actuator(s) 7a, and a spring. The spring may apply force to press the brake pad against the inner rotor 20 with the actuators 7a applying force to release the brake by counteracting the spring. The spring may apply force to remove the brake pad from the inner rotor 20 with the actuators applying force to apply the brake by counteracting the spring. Embodiments of the inner rotor or outer rotor brake are also contemplated without a spring.

The brake controller and the motor controller, which may be combined as a single controller, may generate control signals for the operation of the dual axis motor in one or more sequences that deliver increased torque to the driven device. A first control signal may operate the outer motor by specifying the winding current for the outer stator 18. A second control signal may operate the outer motor by specifying the winding current for the inner stator 19. A third control signal (outer brake signal outer rotor brake signal) may instruct the brake 9 to slow or stop the rim 12. A fourth control signal (inner brake signal or inner rotor brake signal) may instruct the brake 7 to slow or stop the inner rotor 20. The first control signal, the second control signal, and the outer rotor brake signal may be sequenced to increase an output torque.

In addition, the control signals may be generated by a rotor-mounted controller, such as circuit board 11, to provide control of the dual axis motor by controlling the current in the outer rotor 17 and inner rotor 20. This current may be controlled by selectively routing the current from the inner rotor through the outer rotor, by controlling apparent reluctance between the motors, or by management of phasing of the magnetic field between the rotor and stator. Brakes 7 and 9 may be mounted such that the actuators are mounted on the rotating assembly and they may also be controlled by the rotor-mounted controller.

The controller may sequence the control signals in order control the resultant torque provided to the driven device through the carrier 15. In one example, the first control signal first causes the outer rotor 17 to spin up to a specified level. Then, the second control signal causes the inner rotor 20 to spin up to a specified level. Alternatively, the second control signal spins the inner rotor 20 before the first control signal spins the outer rotor 17. The first and second control signals may be simultaneous.

The controller applies the brake 9 to the rim 12 in response to a trigger (e.g., breakout torque trigger). The trigger may be a signal or a message received by the controller. The trigger may include a requested torque value. The trigger may be received from a user input, a load signal, or a feedback signal.

When the trigger is received from a user input, the user has provided an input to the dual axis motor that more torque is requested. The dual axis motor may include a "boost" or "torque assist" option on a control panel. For example, when the driven device is a vehicle the user may select the torque assist when the vehicle is stuck in the muddle, ice, or cannot readily move under normal operation.

When the trigger is received from a load signal the dual axis motor is automatically detecting that additional torque is required by the load. The load signal may be generated from a sensor at the load. For example, the sensor may detect whether or not a shaft or wheel at the load is turning. When it is not turning, the load signal indicates that more torque is required to probably drive the load. The load signal may be a demand signal generated at the driven device and provided to the dual axis motor from the driven device.

When the trigger is received from a feedback signal, the trigger may be provided internally from the dual axis motor. For example, the feedback signal may be provided by a sensor that detects the operation of the carrier 15. When the carrier 15 rotates below an expected rotational speed, or does not rotate at all, the feedback signal may indicate that more torque is required to drive the carrier 15.

The brake signal may have different braking levels depending on the trigger. The braking level may define how hard the brake is applied. The braking levels may be a percentage or proportion of the maximum braking level (e.g., 50% or 90%). The braking level may specify the force applied to the brake. The braking level may define how much to slow the rim 12 (e.g., cut the speed of the rim in half, or reduce the speed of the rim to 60 Hz or 20 radians per second).

The controller may be configured to operate the dual axis motor in multiple modes. Example modes include normal operation mode (e.g., speed controlled mode) and torque assist mode. During the normal operation mode, the controller may control the speed of the inner rotor 20 and/or the outer rotor 17 according to a speed target. During the normal operation mode, the controller may control the speed of the carrier 15 according to a speed target. The controller may generator the command or currents for the inner stator 19 and/or outer stator 18 in response to the speed target. The controller may enter the torque assist mode in response to any of the triggers described herein. In the torque assist mode, the controller applies the brake to the rim 12 in order to increase the torque provided to the carrier 15. Depending on the circumstances, in the torque assist mode, the speed of the inner rotor 20 and/or the outer rotor 17 may vary greatly from the speed target.

Another advantage of the dual axis motor is improved cooling. Because the inner rotor 20 is spinning before the output is provided through the carrier 15, the inner rotor 20 continues to create air movement, which cools the dual axis motor. In other examples, where motors are moving slowly because of increased torque loads, very little cooling is provided by the rotor.

The circuit board 11 may include a communication device to communicate with other electrical machines (e.g., other motors or generators) or with other external devices, such as a controller or user interface. For example, the dual axis motors may be mechanically connected with one or more other dual axis motors for providing torque to the driven devices. The dual axis motors may coordinate to provide increased torque at the same time. As another example, a user interface may provide a target torque to the dual axis motor controller on the circuit board 11.

Figure 4:
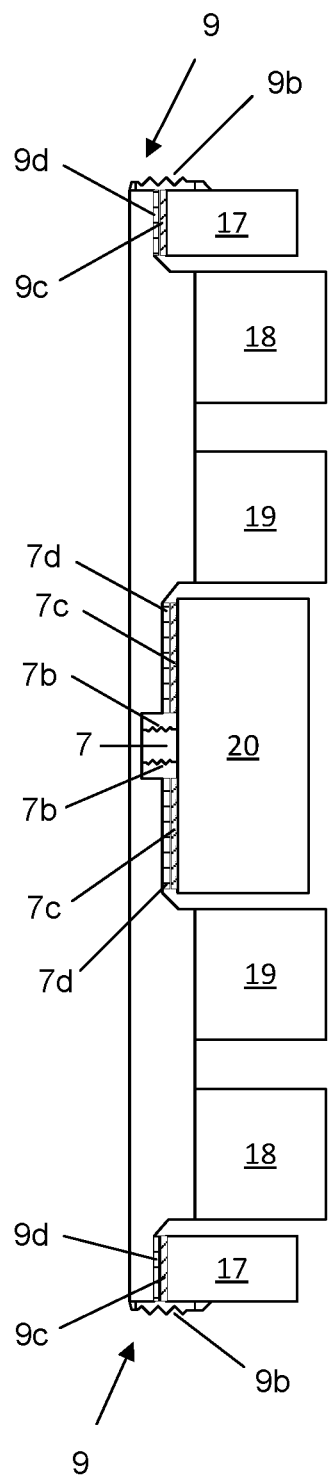
FIG. 4 illustrates a disengaged state for an integrated brake for the dual axis motor.
Figure 5:
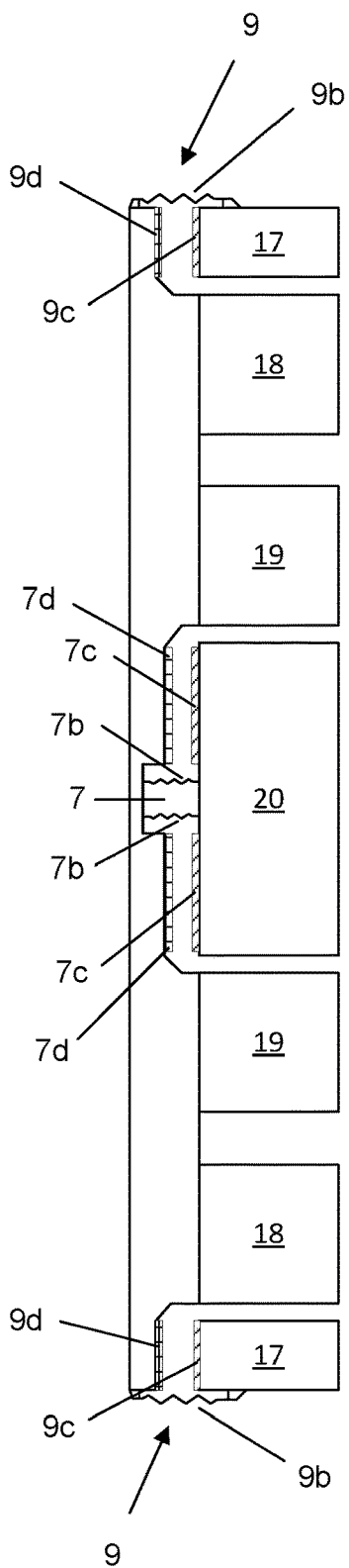
FIG. 5 illustrates an engaged state for an integrated brake for the dual axis motor.

While the brakes 7 and 9 shown in FIG. 3 represent one example device for implementing a braking feature for a dual axis motor, installation of a brake may take many forms in actual design practice. FIGS. 4 and 5 illustrate an integrated brake for a dual axis motor, where the brake is applied by a spring 23 and released by applying current to either the inner stator or outer stator, causing them to shift in line with the inner rotor and outer rotor.

The integrated inner rotor brake may include a brake pad 7c, a spring 7b, a brake plate 7d as part of the brake assembly 7. The spring may be configured to apply force to the brake pad and brake plate. The inner rotor brake 7 may be applied by the solenoid force (acting to align the rotor and stator of each machine). In other embodiments, the brake assembly may also include a brake actuator 7a as shown in FIG. 3. The brake actuator 7a may be configured to apply force to the brake pad 7c and brake plate 7d, counteracting the spring 7b, configured to release the brake 7 when de-energized. The brake actuator 7a may be configured to release force between the brake pad 7c and the brake plate 7d, counteracting the spring 7b, configured to apply the inner rotor brake 7 when de-energized. The positions of the brake pad 7c and the brake plate 7d may be interchangeable. The inner rotor brake 7 may be configured with levers to amplify braking force. The inner rotor brake 7 may be configured to mount the brake pads on inclined planes to amplify braking force. Other embodiments are possible.

The integrated outer rotor brake includes a brake pad 9c, a spring 9b, and a brake plate 9d as part of the brake assembly 9. The spring may be configured to apply force to the brake pad and brake plate. The outer rotor brake 9 may be applied by the solenoid force (acting to align the rotor and stator of each machine). In other embodiments, the brake assembly may also include a brake actuator 9a as shown in FIG. 3. The brake actuator 9a may be configured to apply force to the brake pad 9c and brake plate 9d, counteracting the spring 9b, configured to release the outer rotor brake 9 when de-energized. The brake actuator 9a may be configured to release force between the brake pad 9c and the brake plate 9d, counteracting the spring 9b, configured to apply the brake 9 when de-energized. The positions of the brake pad 9c and the brake plate 9d may be interchangeable. The outer rotor brake 9 may be configured with levers to amplify braking force. The outer rotor brake 9 may be configured to mount the brake pads on inclined planes to amplify braking force. Other embodiments are possible. The springs 7b, 9b may be connected to a rotating member axially fixed to the stator or a stationary member axially fixed to the rotor. The springs 7b, 9b may also be configured to provide a radial force if the brakes 7, 9 are configured to operate in the radial direction. The springs 7b, 9b may be configured to provide torsional compliance to reduce the impulse loading during the brake 7, 9 application. The springs 7b, 9b may be configured to allow the brake 7, 9 to apply quickly. The springs 7b, 9b may include dampening elements to limit the rate at which the brakes 7, 9 can be applied.

The dual axis motor may provide equivalent torque to a similarly sized planetary-reduction motor, while providing an enhanced speed range at a lower torque. The lower torque may be related to the equivalent torque through a reduction ratio. The reduction ratio may be chosen to a different value depending on the application of the final invention.

Figure 6:
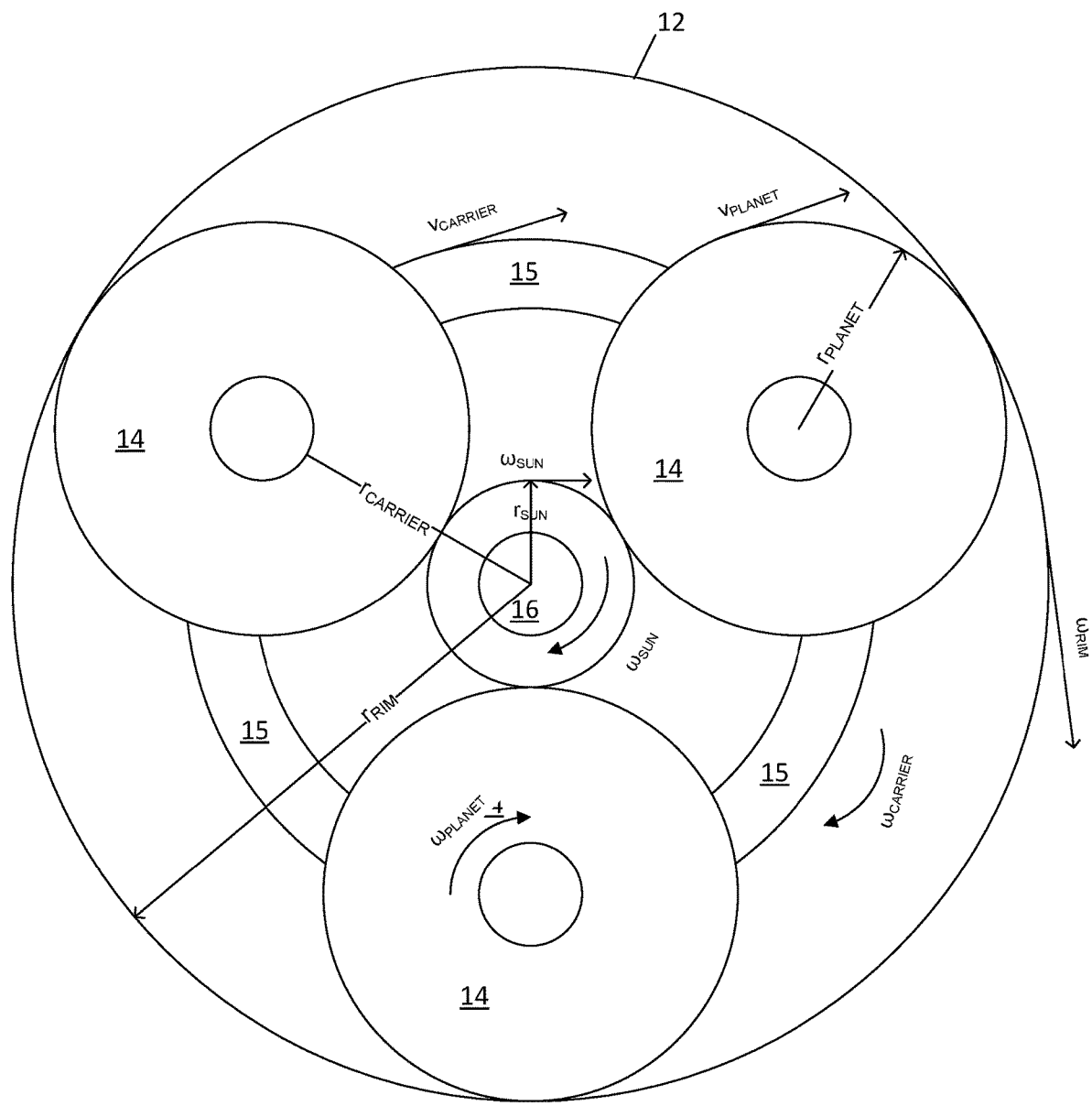
FIG. 6 illustrates a velocity diagram for the dual axis motor.

FIG. 6 illustrates a velocity diagram for the dual axis motor. For each of the carrier 15, the sun 16, and the rim 12, there is a rotational speed (w) and circumferential speed (v), which is the velocity at the engagement center of the gear teeth. The rotational speed is related to the circumferential speed. The circumferential speed (e.g., for the sun 16, the planets, 14 or the rim 12) is the rotational speed multiplied by the effective Radius® of the engagement center of the gear. Equation 1 describes this relationship for the sun 16:

$$v_{SUN} = \omega_{SUN} * r_{SUN} \qquad \text{Eq. 1}$$

As shown by Equation 2, the velocity of the carrier 15 (at the center of the planet gears) is the average of the speed of the rim 12 and the speed of the sun 16.

$$v_{CARRIER} = \frac{v_{SUN} + v_{RIM}}{2} \qquad \text{Eq. 2}$$

In Equation 3, the rotational speed of the carrier 15 is determined from the velocity and the radius.

$$\omega_{CARRIER} = \frac{v_{CARRIER}}{r_{CARRIER}} \qquad \text{Eq. 3}$$

In Equation 4, the rotational speed of the rim can also be easily computed from the velocity and the radius.

$$\omega_{RIM} = \frac{v_{RIM}}{r_{RIM}} \qquad \text{Eq. 4}$$

In Equation 5, the velocity of the rim gear is derived from solving Equations 1-3.

$$v_{RIM} = 2 * \omega_{CARRIER} * r_{CARRIER} - \omega_{SUN} * r_{SUN} \qquad \text{Eq. 5}$$

Substituting gives angular velocity of the rim gear:

$$\omega_{RIM} * r_{RIM} = 2 * \omega_{CARRIER} * r_{CARRIER} - \omega_{SUN} * r_{SUN}$$

$$\omega_{RIM} = \frac{2 * \omega_{CARRIER} * r_{CARRIER} - \omega_{SUN} * r_{SUN}}{r_{RIM}}$$

Since the radius of the carrier must be the average of the sun radius and the rim radius, Equation 6 is a simplified relationship:

$$\omega_{RIM} = \omega_{CARRIER} * \left(1 + \frac{r_{SUN}}{r_{RIM}}\right) - \omega_{SUN} * \frac{r_{SUN}}{r_{RIM}} \qquad \text{Eq. 6}$$

In addition, Equation 7 provides a relationship between the torques of the carrier 15, sun 16, and rim 12 using the conservation of power. Equation 8 is solved for the torque of the carrier.

$$T_{RIM} = \frac{T_{CARRIER}}{\left(1 + \frac{r_{SUN}}{r_{RIM}}\right)} - T_{SUN} * \frac{r_{RIM}}{r_{SUN}} \qquad \text{Eq. 7}$$

$$T_{CARRIER} = \left(1 + \frac{r_{SUN}}{r_{RIM}}\right)\left(T_{RIM} + T_{SUN} * \frac{r_{RIM}}{r_{SUN}}\right) \qquad \text{Eq. 8}$$

The radius of the rim is greater than the radius of the sun. Thus, the torque of the carrier is greater than the torque of the sun and the torque of the rim. This allows the dual axis motor to provide more torque to the output the driven device than would be possible from either of the individual motors. The ratio of the radius of the sun 16 to the radius of the rim 12 may be defined as a planetary ratio. Thus, according to Equation 8, the torque of the carrier 15 is equal to the sum of 1 and the planetary ratio multiplied by the quantity of the torque of the sun 16 scaled by the planetary ratio summed with the torque of the rim 12.

For the examples illustrated herein, the planetary gear ratio refers to the ratio of the number of teeth in the rim gear to the number of teeth in the sun gear. Other definitions of this ratio exist, but the examples and illustrations provide this ratio as a reference. The ratio of the number of teeth on the planets to the sun and rim may not be important to calculation of the behavior of the machine due to the need for all gears in the planetary gear set to mesh. Because they must mesh, their size is related to the size of the rim and the sun and can be defined in terms of that ratio.

Figure 7:
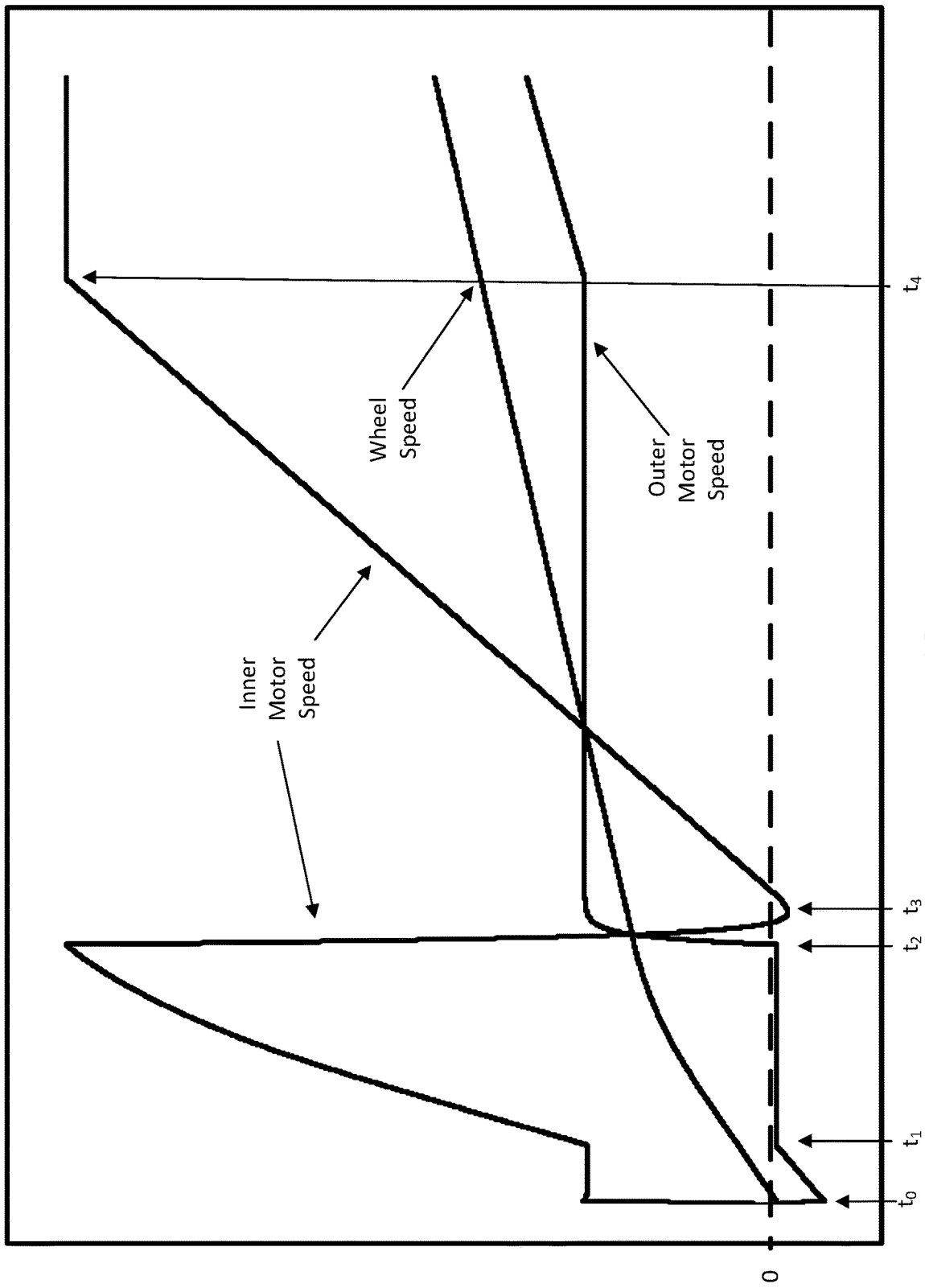
FIG. 7 illustrates a speed graph for a low gear ratio dual axis motor.
Figure 8:
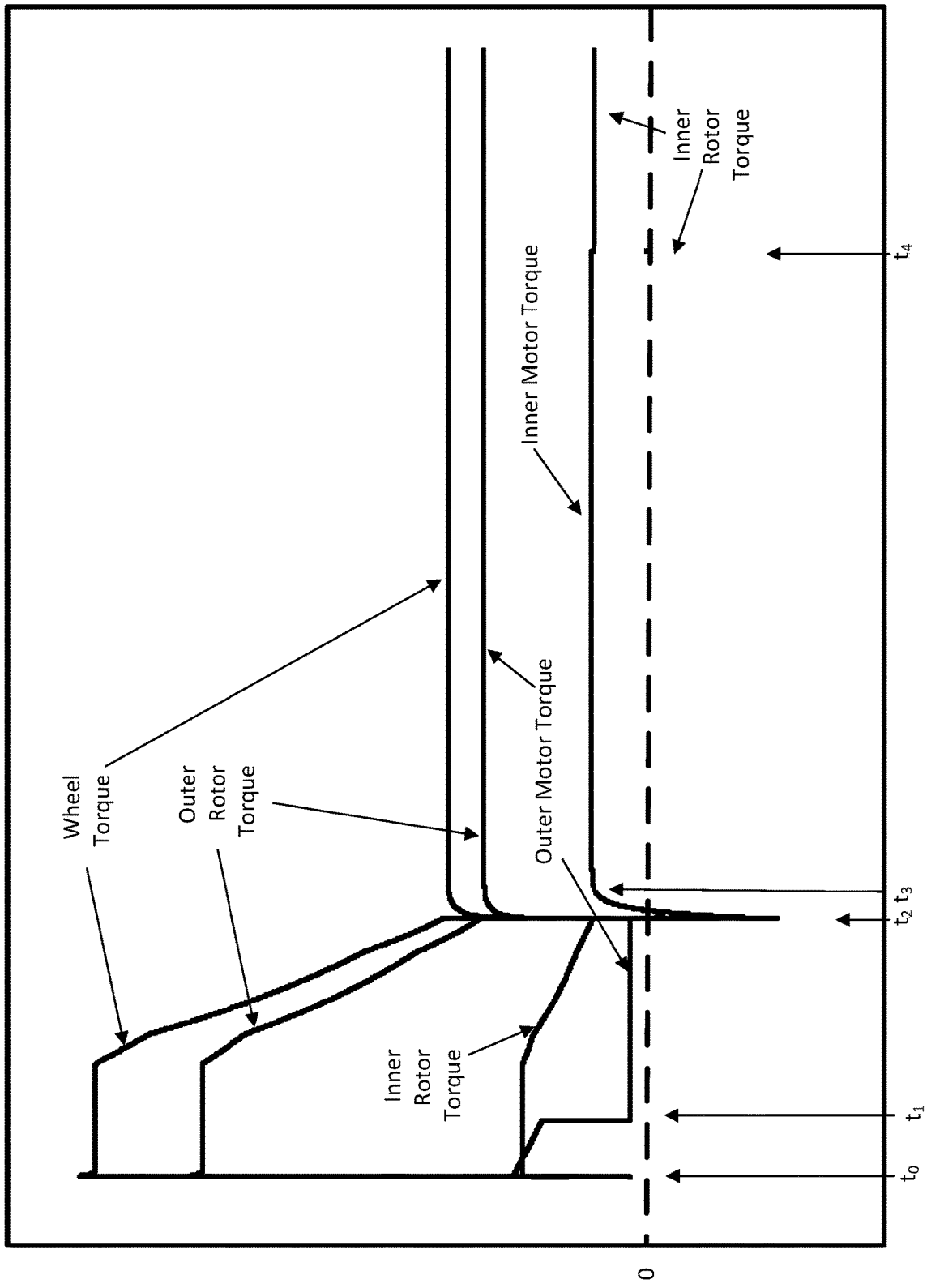
FIG. 8 illustrates a torque graph for a low gear ratio dual axis motor.
Figure 9:
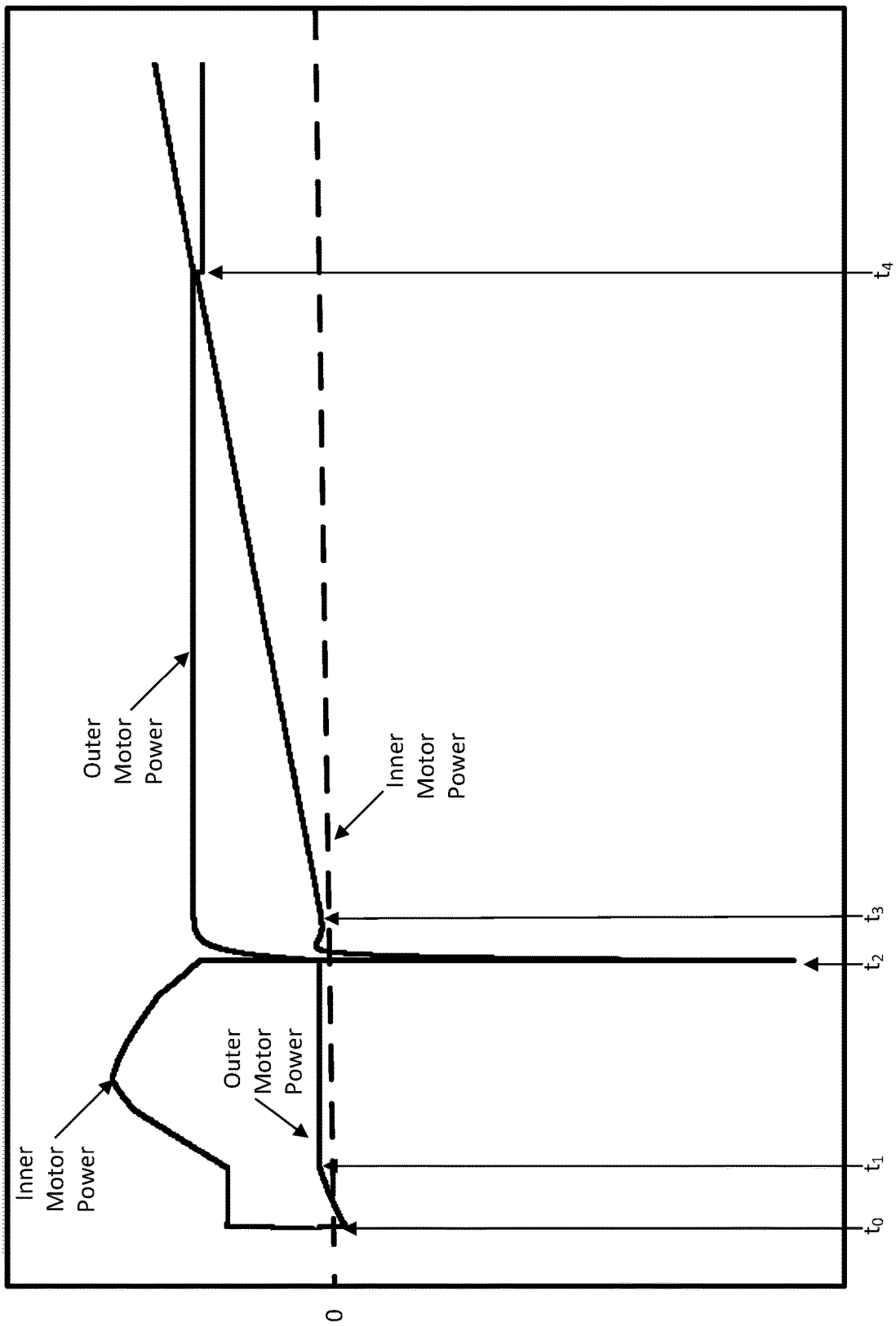
FIG. 9 illustrates a power graph for a low gear ratio dual axis motor.
Figure 10:
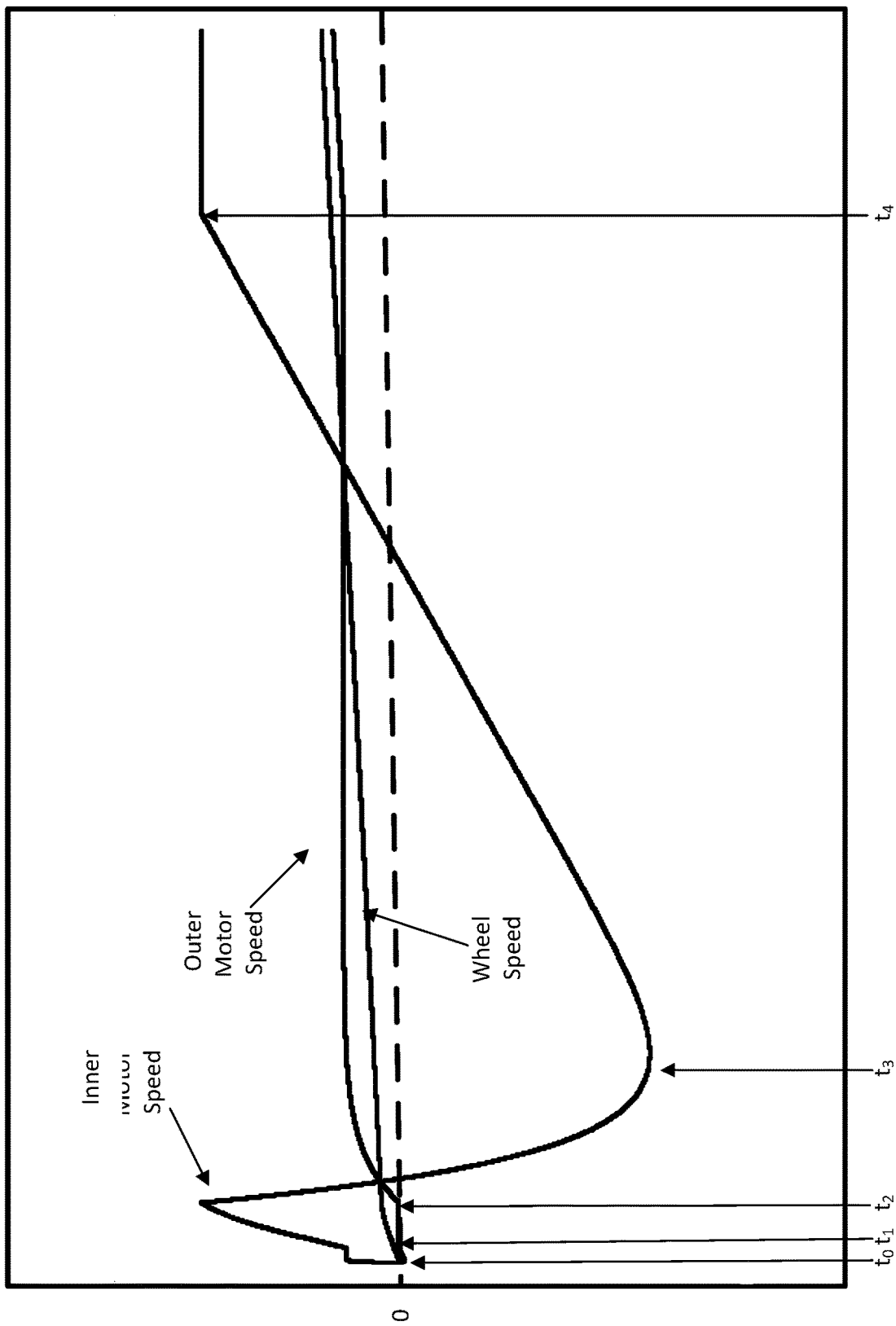
FIG. 10 illustrates a speed graph for a high gear ratio dual axis motor.
Figure 11:
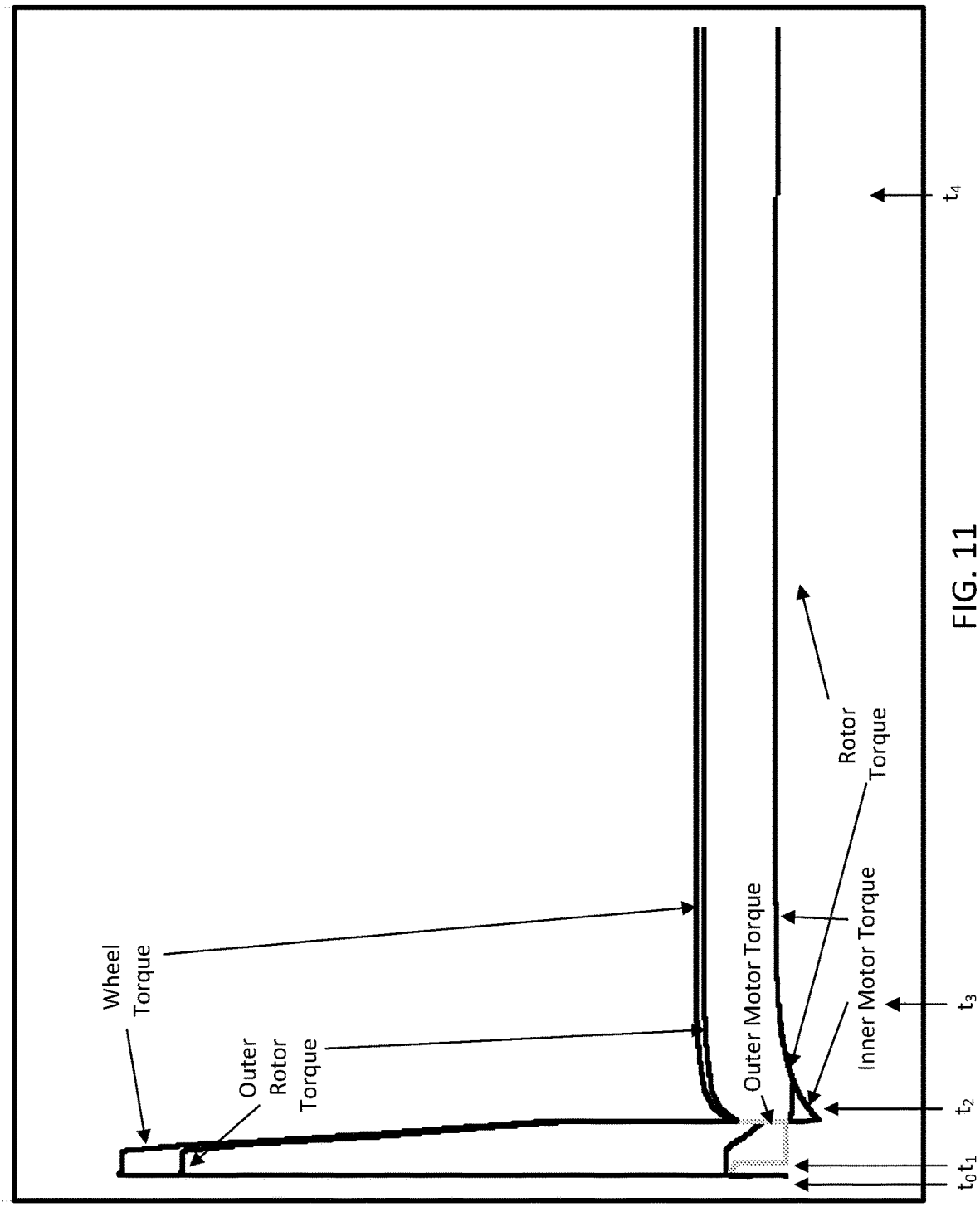
FIG. 11 illustrates a torque graph for a high gear ratio dual axis motor.
Figure 12:
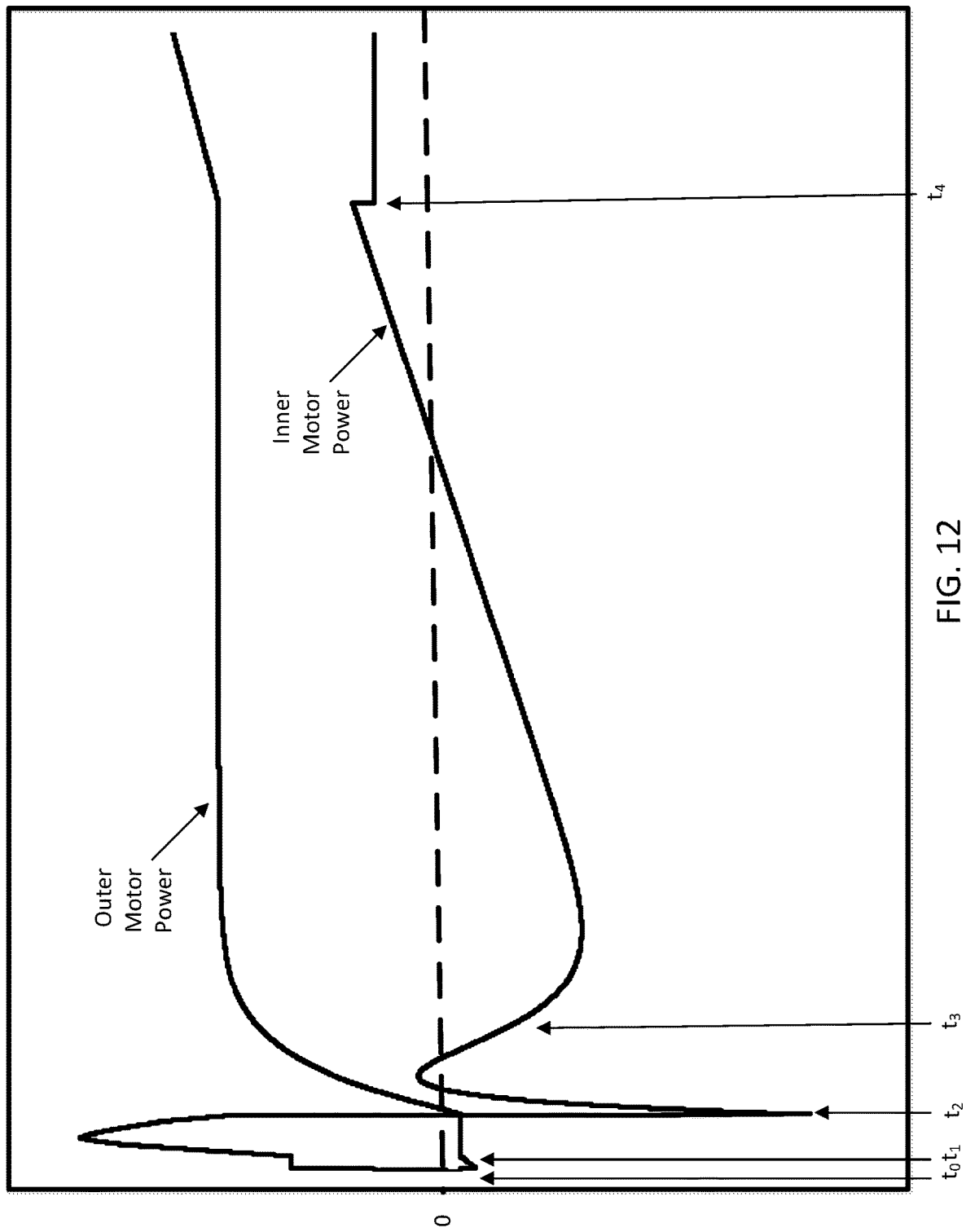
FIG. 12 illustrates a power graph for a high gear ratio dual axis motor.

FIGS. 7-12 illustrate charts from the operation of the dual axis motor illustrated in FIG. 5. FIGS. 7-9 correspond to a low gear ratio (e.g., 4:1) dual axis motor. FIGS. 10-12 correspond to a high gear ratio (e.g., 10:1) dual axis motor.

In these examples, the motor controller generates a first control signal to rotate the inner motor and a second control signal to rotate the outer rotor until the motor speeds match respectively without actual rotation of the output, coupled to the load (e.g. a wheel, pump, compressor, conveyor, or other device). Subsequently, the motor controller generates the brake signal to increase an output on the carrier or the output of the motor. The motor controller may spin up the inner motor and/or the outer motor until a predetermined time, a predetermined speed, or until a requested torque signal is received.

FIGS. 7 and 10 illustrate a speed profile for the inner rotor, outer rotor and output of the example dual axis motor. FIG. 7 illustrates a speed profile for a dual axis motor with a 4:1 drive ratio. FIG. 10 illustrates a speed profile for a dual axis motor with a 10:1 drive ratio. The speed of the outer rotor and inner rotor is initially controlled to prevent rotation of the motor output until time $t_0$. The brake signal is applied to the rim at approximately $t_0$, slowing the outer rotor. Some of this braking action may be provided by regenerative means using the motor windings, while some of the braking action may be provided by applying a brake.

Once the outer rotor comes to a full stop at $t_1$, the output accelerates proportionally to the inner rotor as long at the outer rotor is stopped. Once the inner rotor reaches an operating point $t_2$, defined by an operating characteristic of the motor (e.g. inner rotor speed, inner rotor torque, desired output speed and desired output torque), the outer rotor starts to accelerate while the inner rotor maintains speed. The outer rotor continues to accelerate until reaching maximum speed. In one example, the outer rotor maximum speed is the same as the inner rotor maximum speed, which is the same as the output maximum speed.

In some cases, such as the example illustrated by FIGS. 7 and 10, the inner rotor direction is changed at $t_2$ in order to permit the outer rotor to begin operation at a speed greater than 0. For this example, the inner and outer rotor may receive improved cooling air while operating as opposed to the outer rotor starting at 0 speed. Other embodiments exist, such as an example where the inner rotor provides cooling for both the outer and inner rotor and another example where the inner rotor, outer rotor, or both rotors are cooled without airflow.

Once the outer rotor is spinning at sufficient speed at $t_3$, the inner rotor increases output torque until it reaches maximum speed at $t_4$. Once the inner rotor reaches maximum speed, it reduces torque and the outer rotor begins accelerating. The output torque of the motor is constant from $t_3$ until the outer motor approaches maximum speed at a time to the right of the graph shown in FIG. 7 where the inner motor speed, the outer motor speed, and the wheel speed converge at the maximum speed.

It should be noted that multiple techniques for regenerating power from the output exist at higher speeds, power can be reclaimed from the inner or outer rotor, with higher deceleration torques being applied by a regenerative torque on the inner rotor.

FIGS. 8 and 11 illustrate a torque profile applied between the stationary portion of the motor and the rotating output during normal motor operation, not providing an amplified torque. At $t_0$, the output torque increases and, for at least some time, maintains a level that is greater than both the outer motor torque and the inner motor torque. This output torque is the typical maximum output torque of the motor, which is amplified from the inner and outer rotor torque by the planetary gear set.

The output torque may be further amplified by applying additional braking to the outer rotor, forcing it to come to a stop more quickly, which will also force the inner rotor to slow against the motoring torque. If the outer rotor is stopped more quickly, the inertia from the inner rotor and outer rotor contributes to the torque applied to the wheel, providing a brief amplified torque signal. This amplified torque signal may be repeated while applying a torque slightly below a typical maximum torque at the output by allowing the outer rotor to slowly accelerate and then stopping it again.

The amplified torque may depend on the rate at which the outer rotor and inner rotor are slowed, for example, slowing the inner rotor from 40 Hz to 20 Hz in 1 ms may provide 1.5× normal maximum torque, while slowing the inner rotor from 40 Hz to 20 Hz in 0.5 ms may provide 2.5× normal maximum torque.

At $t_1$, the outer motor provides no torque, although the brake for that rotor must still hold against the reaction torque from the inner motor. As the motor output and inner rotor speed increase, the output torque of the motor decreases due to the inner rotor operating close to maximum speed.

At $t_2$, the output rotor begins to provide torque to accelerate the motor output. In the illustrated example, the inner rotor provides negative torque in order to accelerate in the opposite direction and allow the outer motor to spin at a higher speed. Once the outer rotor is spinning at sufficient speed at $t_3$, the inner rotor increases output torque until it reaches maximum speed at $t_4$. Once the inner rotor reaches maximum speed, it reduces torque and the outer rotor begins accelerating. The output torque of the motor is constant from $t_3$ until the outer motor approaches maximum speed at $t_5$, illustrated on FIGS. 7-9.

FIGS. 9 and 12 illustrate the output power from the inner rotor, the outer rotor and the motor output. During initial acceleration, between $t_0$ and $t_1$, the inner rotor is providing power while the outer rotor is regenerating power. The regenerated power may be returned to the inner rotor to reduce the total demand on the motor. Once the outer rotor stops at $t_1$, the power output of the motor matches the power output from the inner rotor only because the outer rotor is being held stationary.

In the example shown, the inner rotor power flow is reversed when the outer rotor begins spinning at $t_2$ to provide higher-speed operation for the outer rotor. This operation requires the inner rotor to regenerate power until reaching the negative speed. The output torque of the motor decreases during the time that the inner rotor is changing speed, but recovers again once the outer rotor reaches minimum speed at $t_3$.

The outer rotor supplies a fixed power while the inner rotor power increases from a negative number at $t_3$ to a maximum at $t_4$. Once the inner rotor power has reached a maximum, the outer rotor power begins to increase. The outer rotor power increases until the motor approaches the maximum speed for the motor, when the power declines. The total power output of the motor is the sum of the power outputs of the other two motors.

As illustrated by the comparative curves for a low ratio and high ratio dual axis motor, the initial output torque and corresponding acceleration is far higher for a high-ratio dual axis motor, but the torque curve suffers a notable decrease in torque when switching to the outer motor. Lower ratios help to mitigate this transition, but provide significantly lower initial output torque, also called locked-rotor torque.

The dual axis motor may propel a vehicle, providing high torque operation at low speeds and low torque operation at higher speeds. This may extend the operational environments that the vehicle may operate in. In addition, the dual axis motor may extend the regeneration capabilities from the vehicle and provide integrated braking capability. Including spring-applied brakes to the inner and outer rotor may further enhance the vehicle performance by providing an emergency or parking brake.

The dual axis motor may also power a rotary tool such as an impact wrench or hammer drill. The controller may cause the rotors to spin to a predetermined speed and apply the brake to the outer rotor, when a signal is received, such as a periodic signal or the pressing of a button.

The dual axis motor may be used to power industrial equipment requiring additional starting torque, such as a conveyor mechanism, a compressor, or a pump. The dual axis motor may also be used to power equipment requiring operation at a low speed with high torque or a high speed with lower torque, such as a drill, a lathe or a mill.

The dual axis motor may be used to control actuators for movement of a surface or table where the need for high torque and fine control may be occasionally replaced with a need for lower torque and quicker movement.

It should be noted that one skilled in the art could easily apply the principle of the disclosed embodiments to a dual-axis motor with a simplified control system. Such simplified control behavior may be applied, for example, to a dual-axis induction motor and include brake actuators operated by current to the respective stator, allowing simple sequencing of the motor. The breakout torque could be achieved by applying a reduced voltage and current to the stator of the outer motor and a normal voltage and current to the stator of the inner motor, followed by removal of the current to the outer rotor via a relay or other switching mechanism, engaging the brake and generating breakout torque. The outer rotor may then be energized with normal voltage and current once the inner rotor or output reaches a given speed using a centrifugal switch or similar speed-related device.

Figure 13:
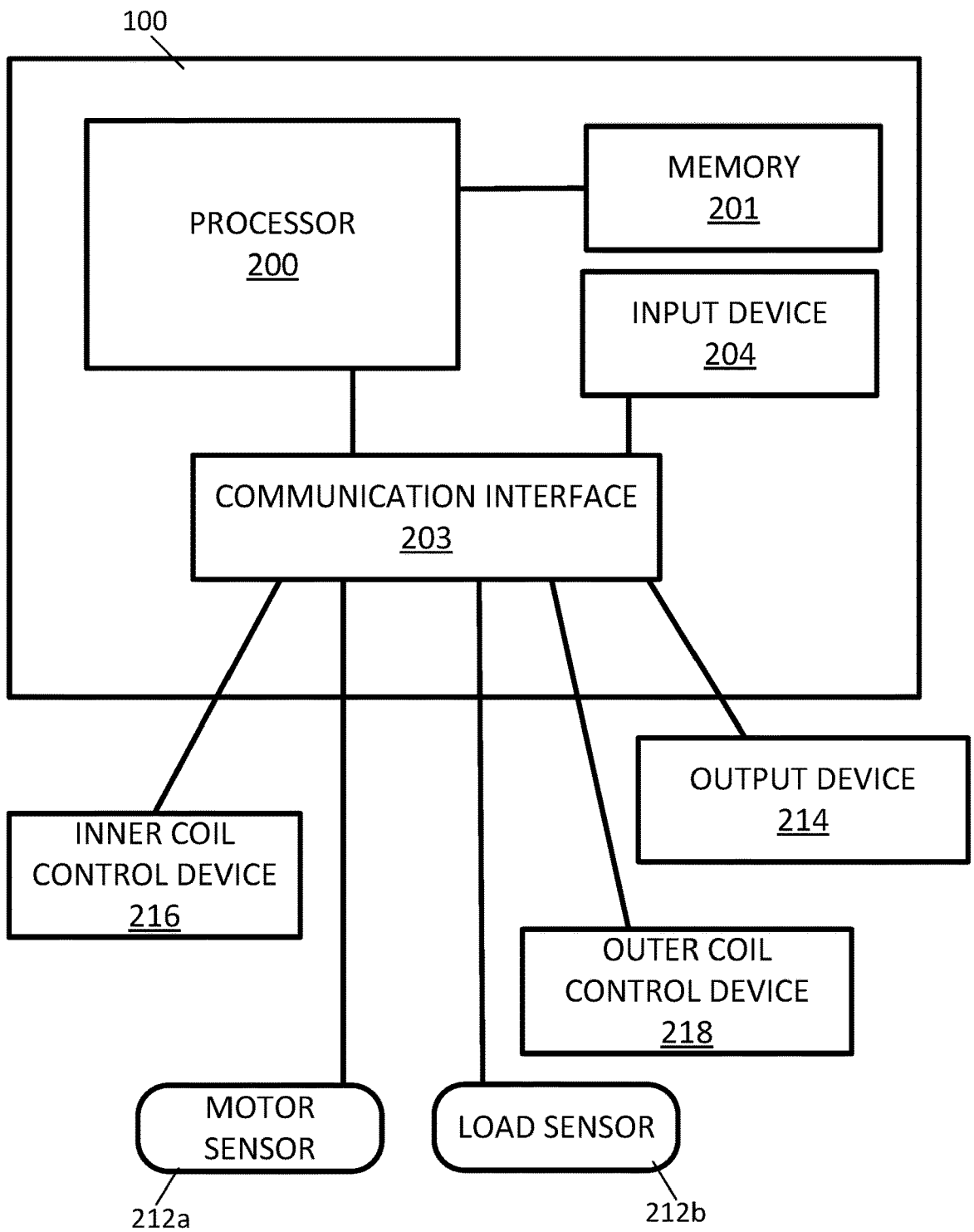
FIG. 13 illustrates an example controller for the dual axis motor.

FIG. 13 illustrates an example controller 100. The controller 100 may include a processor 200, a memory 201, an input device 204, and a communication interface 203. The communication interface 203 may communicate with one or more sensors such as motor sensor 212a and load sensor 212b, an output device 214, the input device 204, an inner coil control device 216, and an outer coil control device 218. Additional, different, or fewer components may be included.

Figure 14:
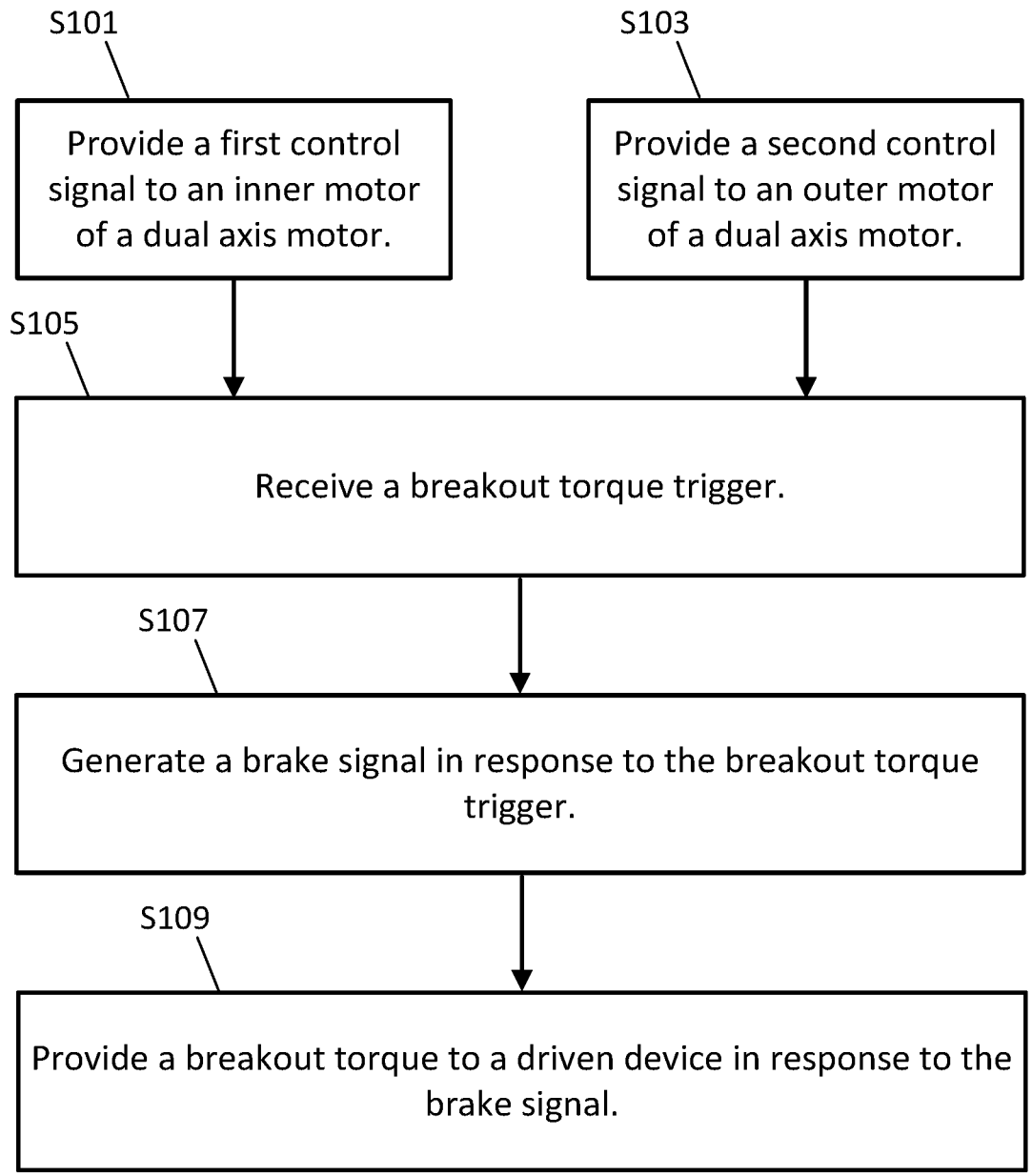
FIG. 14 illustrates a flow chart for the controller of FIG. 13.

FIG. 14 illustrates an example flowchart for operation of the controller of FIG. 13 for controlling the dual axis motor. Additional, different, or fewer acts may be included.

At act S101, the controller 100 provides a first control signal to an inner motor of the dual axis motor. The first control signal may generate a magnetic field that causes an inner rotor to rotate relative to an inner stator. The magnetic field may be generated from a current flowing through coils in the inner stator. The first control signal may be the current flowing through the coils. Alternatively, the first control signal instructs a power source to provide the current through the coils. The processor 200 or the inner coil control device 216 may include a module or may be apportioned to include an application specific controller or integrated circuit as a means for providing a first control signal to an inner motor of the dual axis motor.

At act S103, the controller 100 provides a second control signal to an outer motor of a dual axis motor. The second control signal may generate a magnetic field that causes an outer rotor to rotate relative to an outer stator. The magnetic field may be generated from a current flowing through coils in the outer stator. The second control signal may be the current flowing through the coils. Alternatively, the second control signal instructs a power source to provide the current through the coils. The processor 200 or the outer coil control device 218 may include a module or may be apportioned to include an application specific controller or integrated circuit as a means for providing a second control signal to an outer motor of the dual axis motor.

At act S105, the controller 100 or the communication interface 203 receives a breakout torque trigger. For example, the communication interface 203 may receive data from the input device 204, the motor sensor 212a and/or load sensor 212b. The breakout torque trigger may be a result of sensor data of a measured characteristic (e.g., from the motor sensor 212a and/or the load sensor 212b) of the first magnetic field, the second magnetic field, the inner rotor, the outer rotor, or the driven device. The measured characteristic may be a magnetic field strength (e.g., of the first magnetic field or the second magnetic field), an output torque (e.g., of the inner rotor, the outer router, or the driven device), a speed (e.g., of the inner rotor, the outer router, or the driven device), or an acceleration (e.g., of the inner rotor, the outer router, or the driven device). The breakout torque trigger may be based on a load placed on the dual axis motor from the driven device, which may be a demand signal from the driven device that is received at the communication interface 203.

The input device 204 may receive a torque assist selection from a user to turn on a torque assist. The communication interface 203 is example means for receiving a breakout torque trigger. The input device 204, the motor sensor 212a and/or load sensor 212b are example means for providing the breakout torque trigger.

At act S107, the controller 100 generates a brake signal in response to the breakout torque trigger. The brake signal may cause an actuator to move a brake with respect to the outer motor or the inner motor. The brake signal may include two components, an inner brake signal and an outer brake signal. The outer brake signal controls the outer brake to provide braking torque to outer rotor. The inner brake signal controls the outer brake to provide braking torque to the inner rotor, The actuator may brink a frictional member in contact with the outer motor or the inner motor. The processor 200 may include a module or may be apportioned to include an application specific controller or integrated circuit as a means for generating the brake signal.

At act S109, a breakout torque or resultant torque is provided to a driven device in response to the brake signal. The breakout torque or resultant torque may provide to an output device 214 that rotates with a rotational velocity or acceleration in response to the brake signal. The output device 214 may be an output shaft, gear train, pulley, or belt for driving the driven device. The output device 214 is an example means for providing the breakout torque or resultant torque in response to the brake signal. The resultant torque is attributable to an inertial impulse torque added to the torque generated in the inner air gap by the first magnetic field and the outer air gap by the second magnetic field.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

The input device 204 may include a button, a switch, a key pad, a touchscreen, or other structure configured to allow a user to enter data such as the trigger command to the dual axis motor. The input device 204 may include a connection to a network, a smartphone, a tablet, a personal computer configured to electronically transmit the trigger command to the dual axis motor. The communication may be wireless or wired (e.g., received by the communication interface 203).

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that can store, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An apparatus comprising:
 a first epicyclic gear;
 a second epicyclic gear operative to mesh with the first epicyclic gear and move in relation to the first epicyclic gear to be carried around the first epicyclic gear;
 a rim gear operative to mesh with the second epicyclic gear such that the second epicyclic gear revolves within the rim gear;
 an inner rotor;
 an outer rotor, wherein the inner rotor is connected to the first epicyclic gear and the outer rotor is connected to the second epicyclic gear, or wherein the inner rotor is connected to the second epicyclic gear and the outer rotor is connected to the rim gear;
 a stator assembly spaced from the inner rotor by a first gap and spaced from the outer rotor by a second gap, the stator assembly further comprising:
  an outer stator configured to cause the outer rotor to rotate; and
  an inner stator configured to cause the inner rotor to rotate;
 and
  a controller connected to provide a first control signal to the outer stator for the outer rotor and a second control signal to the inner stator for the inner rotor, wherein the controller is configured to receive a requested torque and to sequence the first control signal, second control signal, and outer rotor brake signal in response to the requested torque,
 wherein the requested torque is received from a load signal or a feedback signal.

2. The apparatus of claim 1, wherein the second epicyclic gear is included in a plurality of second epicyclic gears, the apparatus further comprising:
 a carrier physically connected to the plurality of second epicyclic gears, wherein the carrier provides an output rotation to a driven device.

3. The apparatus of claim 2, wherein the output rotation includes a first torque associated with the first epicyclic gear and a second torque associated with the second epicyclic gear.

4. The apparatus of claim 1, further comprising:
 an outer brake, operatively connected to provide braking torque to outer rotor, wherein the controller is configured to generate an outer rotor brake signal for the outer brake connected to the outer rotor.

5. The apparatus of claim 4, wherein the first control signal, the second control signal, and the outer rotor brake signal are sequenced to increase an output torque.

6. The apparatus of claim 1, further comprising:
 an inner brake, operatively connected to provide braking torque to the inner rotor, wherein the controller is configured to generate an inner rotor brake signal for the brake connected to the inner rotor.

7. An apparatus comprising:
 a first epicyclic gear;
 a second epicyclic gear operative to mesh with the first epicyclic gear and move in relation to the first epicyclic gear to be carried around the first epicyclic gear;
 a rim gear operative to mesh with the second epicyclic gear such that the second epicyclic gear revolves within the rim gear;
 an inner rotor;
 an outer rotor; wherein the inner rotor is connected to the first epicyclic gear and the outer rotor is connected to the second epicyclic gear, or wherein the inner rotor is connected to the second epicyclic gear and the outer rotor is connected to the rim gear;
 a stator assembly spaced from the inner rotor by a first gap and spaced from the outer rotor by a second gap, the stator assembly further comprising:
  an outer stator configured to cause the outer rotor to rotate; and
  an inner stator configured to cause the inner rotor to rotate; and
 a controller connected to provide a first control signal to the outer stator for the outer rotor and a second control signal to the inner stator for the inner rotor; and
 a brake, wherein the brake is an outer brake operatively connected to provide braking torque to the outer rotor or an inner brake operatively connected to provide braking torque to the inner rotor, wherein the controller is configured to generate an outer rotor brake signal for the outer brake connected to the outer rotor or generate an inner rotor brake signal for the brake connected to the inner rotor.

8. The apparatus of claim 7, wherein the controller is configured to receive a requested torque and to sequence the first control signal, second control signal, and outer rotor brake signal in response to the requested torque.

9. The apparatus of claim 8, wherein the requested torque is received from a user input for a torque assist selection made by a user.

10. The apparatus of claim 7, wherein the first control signal, the second control signal, and the outer rotor brake signal or the inner rotor brake signal are sequenced to increase an output torque.

11. The apparatus of claim 7, wherein the second epicyclic gear is included in a plurality of second epicyclic gears, the apparatus further comprising:
 a carrier physically connected to the plurality of second epicyclic gears, wherein the carrier provides an output rotation to a driven device.

12. The apparatus of claim 11, wherein the output rotation includes a first torque associated with the first epicyclic gear and a second torque associated with the second epicyclic gear.

13. A method comprising:
    providing a first magnetic field to rotate an inner rotor fixedly connected to a first epicyclic gear;
    providing a second magnetic field to rotate an outer rotor fixedly connected to a rim gear, wherein the rim gear revolves around the first epicyclic gear and a second epicyclic gear and is meshed with the second epicyclic gear,
    wherein the second epicyclic gear is carried by a carrier coupled to an output shaft providing resultant torque to a driven device; and
    generating a braking signal configured to selectively brake the rim gear meshed with the second epicyclic gear,
    wherein the resultant torque is applied to the driven device in response to the braking signal.

14. The method of claim 13, wherein the resultant torque is attributable to the first magnetic field and the second magnetic field.

15. The method of claim 13, wherein the resultant torque is attributable to a decrease in a rotating speed of the inner rotor or the outer rotor.

16. The method of claim 15, where the decrease in the rotating speed of the outer rotor is caused by application of a brake on the rim gear via the braking signal.

17. The method of claim 13, wherein the first magnetic field is provided by an inner stator spaced from the inner rotor by a first air gap and the second magnetic field is provided by an outer stator spaced from the outer rotor by a second air gap.

18. A method comprising:
    providing a first magnetic field to rotate an inner rotor fixedly connected to a first epicyclic gear;
    providing a second magnetic field to rotate an outer rotor fixedly connected to a rim gear, wherein the rim gear revolves around the first epicyclic gear and a second epicyclic gear and is meshed with the second epicyclic gear,
    wherein the second epicyclic gear is carried by a carrier coupled to an output shaft providing resultant torque to a driven device; and
    generating a braking signal configured to selectively brake the rim gear meshed with the second epicyclic gear,
    wherein the resultant torque is applied based on a measured characteristic of the first magnetic field, the second magnetic field, the inner rotor, the outer rotor, or the driven device.

* * * * *